United States Patent [19]

Maqueira

[11] Patent Number: 5,274,314
[45] Date of Patent: Dec. 28, 1993

[54] ADAPTIVE FRICTION COMPENSATOR

[75] Inventor: Benigno Maqueira, Atlanta, Ga.

[73] Assignee: Texas Instruments Incorporated, Dallas, Tex.

[21] Appl. No.: 17,218

[22] Filed: Feb. 12, 1993

[51] Int. Cl.$^5$ .................. B64C 17/02; F41G 7/22; G05D 1/08

[52] U.S. Cl. .................. 318/632; 318/640; 318/648; 244/3.15; 244/3.2

[58] Field of Search .................. 318/560–696, 318/694, 648, 254, 312, 138; 364/160–190; 74/5.1–12; 244/3.2, 3.14, 3.15; 425/145

[56] References Cited

U.S. PATENT DOCUMENTS

| | | | |
|---|---|---|---|
| H455 | 4/1988 | Helton | 244/3.15 |
| 3,920,199 | 11/1975 | Woodworth et al. | 244/3.2 |
| 3,936,716 | 2/1976 | Bos | 318/591 |
| 3,986,092 | 10/1976 | Tijsma et al. | 318/649 |
| 4,396,878 | 8/1983 | Cole et al. | 318/648 |
| 4,418,306 | 11/1983 | Samsel | 318/648 |
| 4,488,249 | 12/1984 | Baker | 364/571 |
| 4,500,823 | 2/1985 | Walrath | 318/632 |
| 4,508,293 | 4/1985 | Jones | 244/3.15 |
| 4,540,923 | 9/1985 | Kade et al. | 318/561 |
| 4,555,757 | 11/1985 | Dorman | 318/632 X |
| 4,590,476 | 5/1986 | Burkett | 343/7.4 |
| 4,727,303 | 2/1988 | Morse et al. | 318/616 |
| 4,765,573 | 8/1988 | Wells | 244/3.15 |
| 4,803,413 | 2/1989 | Kendig et al. | 318/648 |
| 4,995,478 | 2/1991 | Oshima et al. | 187/115 |
| 5,187,417 | 2/1993 | Minnich et al. | 318/254 |

Primary Examiner—Paul Ip

Attorney, Agent, or Firm—René E. Grossman; Richard L. Donaldson

[57] ABSTRACT

A friction compensation system which augments a stabilization rate loop includes a first summer (11) responsive to a rate command signal and a feedback signal to provide a torque command signal, a second summer (17) responsive to the torque command signal via torquer (15) and the gimbal torque disturbances to provide a net applied torque, a gimbal (19) subjected to the gimbal torque disturbances and having an inertial rotation governed by the net applied torque and a gyro (21) responsive to the inertial rotation of the gimbal to provide the feedback signal. An adaptive friction compensator responsive to the torque command signal provides an enhanced torque command signal to which an intermediate third summer (33) is responsive in accordance with a predetermined model (31) which is adjusted adaptively in realtime. The third summer is responsive to the torque command signal and the enhanced torque command signal to control the gimbal. The adaptive friction compensator includes an estimator responsive to a signal indicative of relative rate measurement. The torque disturbance model (31) is responsive to the estimator and the indication of relative rate measurement to provide the enhanced torque command signal. The estimator includes a coulomb friction level estimator (25) responsive to the indication of relative rate measurement and a spatial time constant estimator (27) responsive to the indication of relative rate measurement. The adaptive friction compensator has the goal of adjusting itself to obtain the best cancellation of the torque disturbances with the enhanced torque command signal.

20 Claims, 3 Drawing Sheets

ADAPTIVE FRICTION COMPENSATOR

BACKGROUND OF THE INVENTION

1. Field of the Invention

This invention relates to friction compensation and, more specifically, to an adaptive friction compensator (AFC) to augment conventional stabilization rate loops to improve line-of-sight (LOS) jitter performance, primarily in LOS stabilization and pointing systems.

2. Brief Description of the Prior Art

Frequency compensation is generally utilized in conventional stabilization rate loops to improve LOS jitter performance in stabilization and pointing systems by canceling torque disturbances, predominantly due to bearing and torquer friction. Torque disturbances in the stabilization system cause LOS jitter which limits and frequently hinders the desired overall system performance, such as modulation transfer function (MTF) (a measure of the amount of degradation of a recorded image when LOS jitter is introduced), tracking, identification, range requirements, etc. These torque disturbances arise mainly from the linear and/or rotary base environments to which the systems are subjected during their mission. Common major sources of torque disturbances in linear environments are due to gimbal imbalance and structural flexure. In rotary environments, major disturbances include coulomb and viscous friction and cable/gas-line spring and damping effects. Since most environments are a combination of linear and rotary vibrations, all of the above mentioned disturbances contribute to the LOS jitter. Possibly the most difficult source of disturbances to estimate and reduce in hardware is coulomb friction in bearings, seals, twist caps and brush torquers. Friction is also difficult to control in hardware due to the following sources which cause the characteristics of friction to change with time:

a) temperature effects, which cause variations in alignment, stress and bearing pre-load.

b) non-linear characteristics of friction, which are a function of relative rate amplitude and frequency content.

c) gimbal pointing angle, due to variations in pre-load and tolerances along the bearing circumference.

d) gimbal slew rate, which affects the relative rate dynamics and introduces variable lubrication effects as the bearing balls rotate.

From a control and/or compensation point of view, coulomb friction is also one of the most difficult disturbances to reject due to its step-like disturbance characteristics. For this reason, friction disturbances require high bandwidth compensation techniques with time delays negligible compared to the rise time of the disturbance waveform. Conventional rate loops, for reasons discussed hereinbelow, are significantly limited in bandwidth for purposes of compensating coulomb friction disturbances. By the time the rate loop senses LOS jitter, such jitter has already occurred and requires a finite amount of time to correct.

One of the requirements of a well designed stabilization rate loop is the cancellation or rejection of torque disturbances by generating a torque command equal and opposite to the disturbance as it occurs. This is generally accomplished in conventional rate loops by feeding back the LOS jitter rate obtained with a gyroscope and applying proportional plus integral (PI) compensation to generate the torque commands. The main limitation in rejecting the disturbances is the time delay inherent in rate loops due to bandwidth limitations of typically 40 to 90 Hz. These limitations arise mainly from gyroscope noise which causes saturation if an attempt is made to increase the bandwidth and from gimbal structural resonances which cause the rate loop to become unstable if the bandwidth is increased significantly. The fundamental problem with disturbance cancellation using a rate loop is that LOS motion must first exist before the rate loop can become active. However, the primary goal of stabilization is to eliminate such LOS motion as caused by unknown, uncontrollable torque disturbances and not permit it to occur in the first place. Other requirements of a well designed rate loop include precise control of LOS scan and slew rates and LOS step-stare pointing.

The prior art includes an "adaptive bearing compensator" as set forth by Walrath, C. D., "Adaptive Bearing Friction Compensation Based On Recent Knowledge of Dynamic Friction", *Automatica*, Vol. 20, No. 6, 1984, to solve the friction torque disturbance problems discussed herein. The main disadvantage of the adaptive bearing compensator is the lack of real-time feedback to update the friction model which estimates the disturbance. Without such feedback or adaptive mechanism, there is no way to assure that all or most of the friction disturbance is actually being canceled. Moreover, there is no way to assure that the disturbance is not being over-compensated due to a decrease in friction caused, for example, by changes in temperature and/or relative rate frequency spectrum. Instead, the proportionality constant relating friction to relative rate is verified during laboratory experiments and assumed to have a constant relationship to friction during system operation.

The torque observer approach in the prior art, much like the rate loop, is limited in bandwidth due to gimbal structural resonances and acceleration sensor bandwidth and noise. In addition, it requires a mathematical model of the gimbal inertia and structure, but provides no means for adaptively updating and verifying the model in real-time. It is expected that the total gimbal inertia and frequency of structural resonances will vary with gimbal angle.

In the case of a non-linear controller, in order for this technique to yield significant improvement in stabilization, the large-error-gain must be increased significantly compared to the nominal loop gain. This increase in gain results in momentary instability when the LOS error (or jitter level) exceeds the threshold. Although stabilization is improved at the dominant frequency of the disturbance, this instability causes the LOS jitter to increase at higher frequencies in much the same manner as a limit cycle or structural resonance.

With reference to adaptive noise cancellation (ANC), the main disadvantage of this approach is the requirement of a reference signal correlated with the torque disturbance. In practice, the torque disturbance is unknown and not measurable. It is believed that the relative rate could be used as the correlated signal in ANC for friction disturbances. However, due to its linear theory development, it is not expected that the ANC will compensate the step-like non-linearities associated with friction. The computational requirements of ANC limit this technique to digital implementation in practice. Analog implementation is not feasible.

SUMMARY OF THE INVENTION

In accordance with the present invention, adaptive friction compensation is utilized to improve the stabilization performance of conventional rate loops by canceling friction disturbances as they occur without requiring additional or higher bandwidth measurement of the LOS motion. Instead, the AFC requires a measurement of the base inertial rate or gimbal relative rate. Relative rate is the rate difference between the inertial gimbal rate and the inertial base rate on which the gimbal is mounted. Measurement of the base rate requires additional sensors in conventional stabilization systems. However, the relative rate may be obtained from existing resolvers or encoders or the addition of a tachometer to the system in known manner.

The AFC utilizes the rate loop itself to obtain an approximate measure of the disturbances which are correlated with the relative rate. With the AFC active, the disturbances are canceled and only residual torque disturbances are left for the rate loop to compensate. These residual disturbances arise mainly from mismatch in cancellation of friction, spring and damping torques. The response of the rate loop to rate commands remains unaffected since rate commands are uncorrelated to the relative rate at high frequencies (above about 3 Hz). Recommendations are provided hereinbelow for cases where the rate command is correlated to the relative rate.

Briefly, there is provided a stabilization rate loop as in the prior art with adaptive friction compensation being injected into the stabilization rate loop on-line to cancel frictional disturbances as they occur. This is accomplished by providing a stabilization rate loop as in the prior art composed of a first summer which receives, as one input thereto, a rate command and feeds a rate compensation circuit which, in turn, feeds a driver/torquer to provide the motor torque. A second summer, representing the additive nature of torque disturbances, sums the motor torque and torque disturbances to generate the net applied torque to a gimbal. The gimbal inertial rotation in response to the net applied torque is sensed by a gyroscope mounted thereon. The gyroscope output and a noise signal are summed in a third summer representing the additive nature of the gyroscope quiescent noise. Quiescent noise is defined as the measured output of a sensor when the input to the sensor, the measured signal, is zero. The quiescent noise is generated internally by the gyroscope. However, since the quiescent noise is uncorrelated with the gimbal inertial rate, it is represented as an external input. The gyroscope quiescent noise is included to show that the present AFC invention is robust enough to filter out the effects of gyroscope uncorrelated noise, the details of which are described hereinbelow. The output of the third summer is returned to the first summer, thus closing the rate loop. The stabilization rate loop with the above enumerated elements is in the prior art.

It will be assumed that the rate command and gyroscope quiescent noise are zero to simplify the description herein. In practice, both of these components are uncorrelated with the relative rate within the frequency range of interest (3 to 100 Hertz) so no generality is lost in making this assumption. When disturbances are not being canceled, a net disturbance is applied to the gimbal and the rate loop torque command signal from the rate compensation circuit is non-zero to cancel the disturbance with an equal and opposite torque command. Conversely, when the disturbances are being canceled, the rate loop torque command goes to zero since there is no net disturbance applied. It is the intent to drive and maintain at zero the portion of the rate loop torque command signal which is correlated with the relative rate, thus indicating that the torque disturbances correlated with the relative rate are being canceled exactly. It is this rate loop torque command signal which is fed to the adaptive friction compensation algorithm which is an essential feature of this invention.

The torque command signal from the rate compensation circuit is sent to a coulomb friction level (CFL) estimator and to a spatial time constant (STC) estimator which, respectively, estimate the coulomb friction level and, independently, the spatial time constant of the friction disturbance wave form. The estimators also are provided with an input corresponding to the relative rate, since friction, spring and viscous damping are correlated to the relative rate of the gimbal bearings. The relative motion can be: (a) measured directly as with a tachometer or resolver or (b) derived by subtracting the gimbal inertial rate from the gimbal gyroscope with the base inertial rate from a second gyroscope mounted on the base.

The relative rate measurement is fed into the CFL estimator and the STC estimator as well as into a torque disturbance model which is a digital or analog reference model of the relationship between the torque disturbances and the relative rate. The torque disturbance model also receives the estimates of the friction level and the spatial time constant for continuous update of the model. The output of the torque disturbance model is a high bandwidth estimate of the friction disturbance and is subtracted from the torque command signal in a fourth summer which is added to the prior art stabilization rate loop as discussed above, to generate the net torque command to the gimbal torquer. It can be seen that the torque disturbance has been adaptively estimated on-line with immediate and concurrent compensation provided for the disturbances as opposed to the prior art delay wherein compensation takes place only after LOS jitter caused by these disturbances is encountered.

The output of the fourth summer drives the driver/torquer, the output of which is fed to the second summer which adds thereto the torque disturbance which includes gimbal friction and spring and viscous damping. The output of the second summer drives the gimbal and causes movement of the gimbal in accordance therewith. The inertial rate is sensed by a gyroscope which is mounted on the gimbal. The output of the gyroscope is corrupted by gyroscope quiescent noise generated internally by the gyroscope itself, but uncorrelated with the gimbal inertial rate. This gyroscope quiescent noise is represented by summing the gyroscope output and a quiescent noise signal in a third summer, the output of this summer being fed back to the first summer to complete the rate loop.

DESCRIPTION OF THE PREFERRED EMBODIMENT

Figure 1:
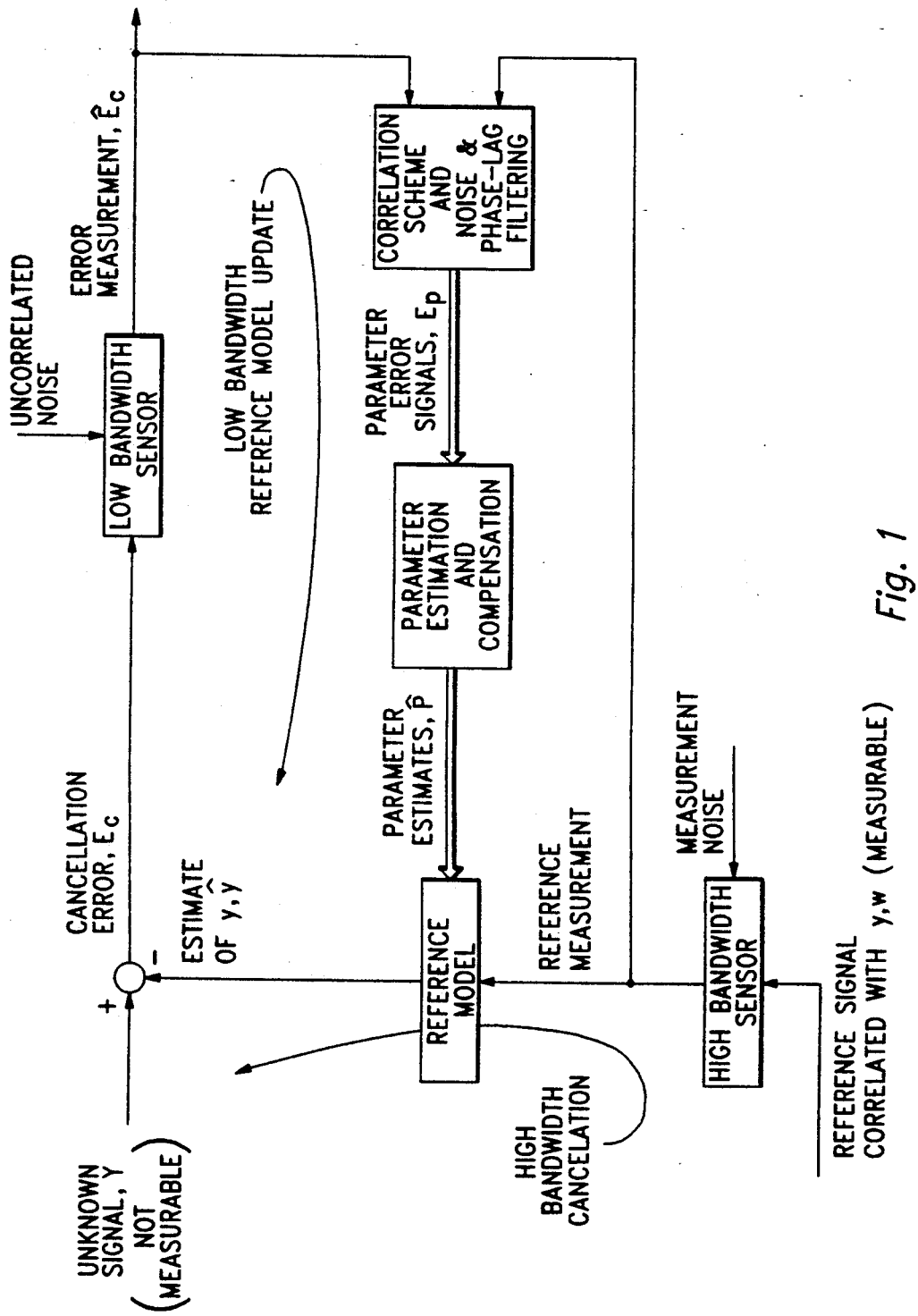
FIG. 1 is a diagram of the generalized concept of the adaptive friction compensation in accordance with the present invention with the rate loop represented more generally as a low bandwidth sensor.

Referring first to FIG. 1, there is shown a diagram of the present inventive concept. An unknown and not measurable signal y, is reconstructed in real-time with minimum phase delay as the output (estimate of y) of a reference model. The input to the reference model is generated from a high bandwidth sensor measurement of a reference signal correlated to the unknown signal y. The reference signal can be any measurable quantity for which a reference model can be constructed. The reference model, upon accepting input, from the reference signal, must reconstruct the essential features of the unknown signal y. In the case of friction disturbances, the reference signal is the relative rate and the essential features are the coulomb friction level, CFL, and the spatial time constant, STC. For other applications, it is up to the designer to make the best selection of reference signal and reference model for the particular application. The cancellation error, $E_c$ between the unknown signal y, and its estimate (estimate of y) is measured with a low bandwidth sensor to provide an error measurement which is subsequently correlated with the reference measurement and conditioned with noise and phase-lag filtering. This correlation scheme generates parameter error signals, $E_p$, which are compensated and used to estimate the parameters of the reference model. The parameter compensation determines the speed and accuracy with which the parameter estimates converge to their correct values for minimizing the cancellation error, $E_c$. The intent is to select model parameters for which the parameter error signals approach zero as the error between the output of the reference model and the unknown signal approaches zero, thus achieving the desired result.

Figure 2:
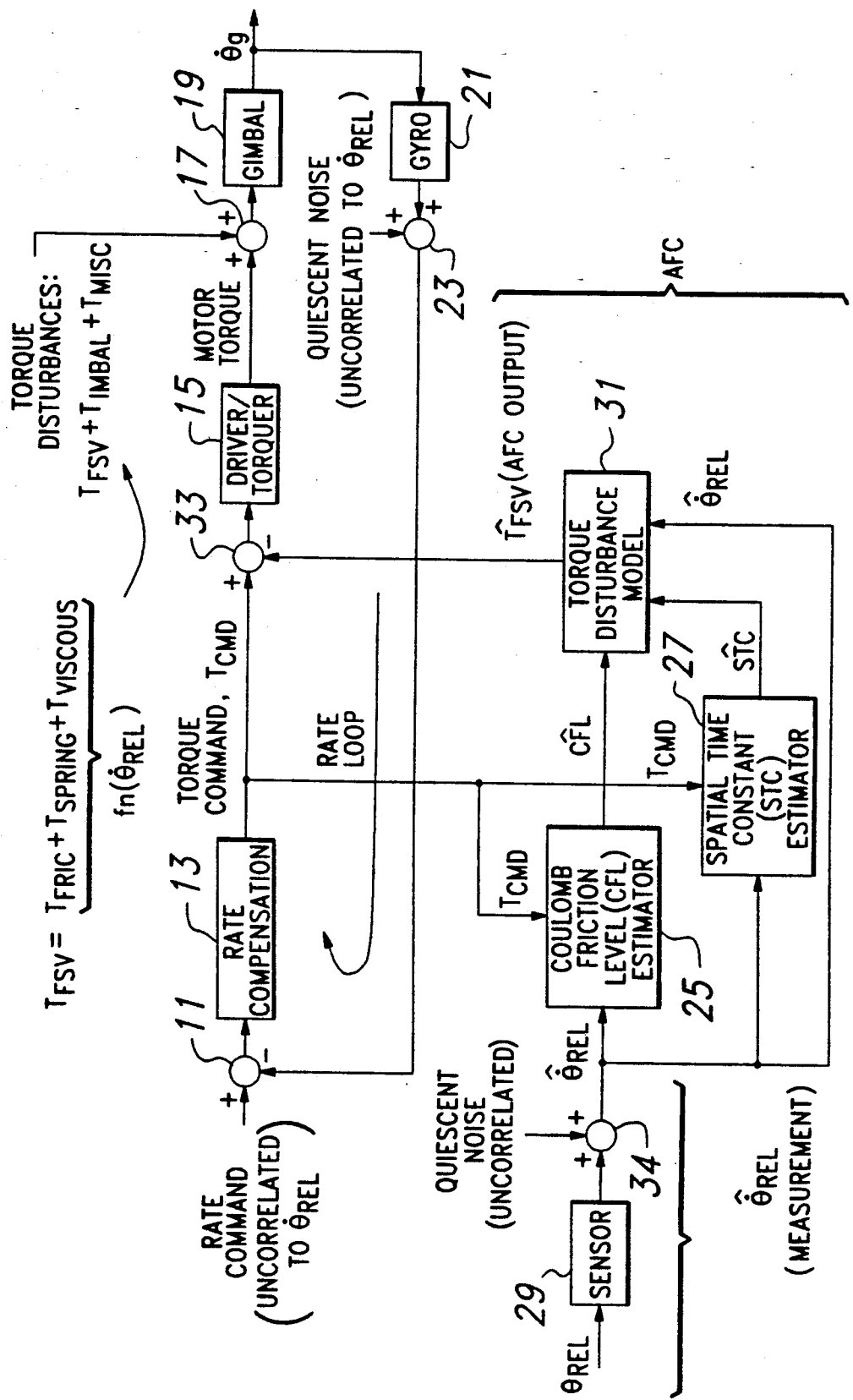
FIG. 2 is a block diagram of the adaptive friction compensation system as applied to stabilization systems in accordance with the present invention.

Referring now to FIG. 2, there is shown a simplified block diagram of a system in accordance with the present invention wherein (as well as in FIG. 3) the algorithms are described mathematically by the Laplace Transform block diagrams. These block diagrams can be implemented using a microprocessor which requires assembly language. The assembly language, in turn, is obtained from software coded in any desired language, such as Fortran, C, etc. The block diagrams can also be implemented directly in electronics with various electrical circuits. In addition, there is provided in the Appendix the AFC algorithms coded in C which is redundant to the materials otherwise provided. The code in C is provided to show how the AFC algorithms of FIG. 3 can be implemented in software. The system includes a stabilization rate loop which is composed of a summer 11 which receives as one input thereto a rate command and feeds a rate compensation circuit 13 which, in turn, feeds a driver/torquer 15 to provide motor torque. A summer 17, representing the additive nature of torque disturbances, sums the motor torque and torque disturbances to generate the net applied torque to control a gimbal 19. The gimbal 19 inertial rate response, $\Theta_g$, to the net applied torque is sensed by a gyroscope 21 mounted thereon. Summer 23, representing the additive nature of the gyroscope quiescent noise, sums the gyroscope output and an uncorrelated and bounded, but otherwise arbitrary, gyroscope quiescent noise signal. The output of the summer 23 is fed back to the summer 11. The stabilization rate loop with the above enumerated elements is in the prior art. The gyroscope noise signal is included to demonstrate that the present AFC invention is capable of operating properly in the presence of sensor measurement noise.

It will be assumed that the rate command and gyroscope quiescent noise are zero to simplify the description herein. In practice, both of these components are uncorrelated with the relative rate within the frequency of interest (3 to 100 Hertz) so no generality is lost in making this assumption. When disturbances are not being canceled, a net disturbance is applied to the gimbal and the rate loop torque command signal from the rate compensation circuit 13 is non-zero to cancel the disturbance with an equal and opposite torque command. Conversely, when the disturbances are being canceled, the rate loop torque command will go to zero since there is no net disturbance applied. It is the intent to drive and maintain at zero the portion of the torque command signal which is correlated with the relative rate, thus indicating that the torque disturbances correlated with the relative rate (such as friction) are being canceled exactly. To this end, the rate loop torque command signal is fed to the adaptive friction compensation algorithm which is the subject matter of this invention.

If, for a specific application, the rate command is expected to be correlated with the relative rate within the frequency range of interest, the component of the rate loop torque command that is caused by the rate command, as opposed to being caused by the torque disturbances and gyroscope noise, can be estimated using a model of the rate loop response to rate commands (not shown in FIG. 2). Specifically, in addition to feeding the summer 11, the rate command also feeds a model of the rate loop (not shown). The output of this rate loop model is the estimate of the component of the rate loop torque command caused by the rate command only. This estimate of the component of the rate loop torque command is then subtracted from the rate loop torque command used as inputs to the CFL and STC estimators 25 and 27, respectively, prior to being used by these estimators. The rate loop torque command feeding summer 33 is not changed in any way and remains equal to the output of the rate loop compensation 13.

As can be seen in FIG. 2, the torque command signal from the rate compensation circuit 13 (minus any effects of correlated rate command as discussed above) is sent to a coulomb friction level (CFL) estimator 25 and to a spatial time constant (STC) estimator 27 which, respectively, estimate the coulomb friction level and, independently, the rise time of the friction disturbance wave form. Typically, coulomb friction is identified as a square wave of variable time period though, in fact, it has rounded edges and can be associated with a time constant. The estimators 25 and 27 also are provided with an input corresponding to the relative rate, $\Theta_{rel}$, since friction, spring effects and viscous damping are dependent upon relative rate of the gimbal bearings. Relative rate refers to the motion between the gimbal 19 and the base to which it is mounted via bearings. More specifically, the relative rate is the rate difference between the inertial gimbal rate and the inertial base rate. The relative motion is measured directly with sensor 29 which is a tachometer or a resolver. Regardless of which type of sensor is used, one side of the sensing element of sensor 29 is mounted on the gimbal 19 and the other side of the sensing element is mounted on the base, thus measuring the relative motion directly. If a tachometer is used, the output of sensor 29 will be a direct measurement of the relative rate. If a resolver is used, the output of sensor 29 will be a derived relative rate measurement obtained by differentiating and filtering with a low-pass filter (to remove high frequency noise) the relative position output of the resolver. A third way (not shown in FIG. 2) to obtain the relative rate measurement, particularly for stabilization systems since the desired gimbal rate is zero except at very low frequencies (less than 3 Hz typically), is to use a second gyroscope mounted on the base to measure the inertial base rate. The relative rate is then obtained by subtracting the inertial base rate of the second gyroscope from the inertial gimbal rate of gyroscope 21.

Independently of which method is used to obtain the relative rate measurement, the additive nature of sensor quiescent noise is represented by summing the output of sensor 29 with a noise signal via summer 34. This noise component is generated by the sensor itself, however, since the quiescent noise is uncorrelated with the input to the sensor, it can be represented as an independent external input. The sensor quiescent noise is included to show that the present AFC invention is robust enough to filter out the effects of uncorrelated noise via low-pass filtering in the CFL and STC estimators.

The relative rate measurement is fed into the CFL estimator 25 and the STC estimator 27 as well as into a torque disturbance model 31 which is a digital or analog reference model of the relationship between the torque disturbances and the relative rate. The torque disturbance model 31 also receives, and is continuously updated by, the estimates of the friction level and the spatial time constant.

Experimental measurements of the torque disturbance waveforms generated by bearing friction were studied to develop the simplest and least computationally intensive torque disturbance reference model that could be implemented using either analog circuitry or digital processing. Specifically, following the friction measurement techniques in the prior art, a stabilization system utilizing the stabilization rate loop in the prior art was subjected to known, controlled base inertial motions at various amplitudes and frequencies. Approximate measurements of the torque disturbances caused by friction were obtained from the output of the rate compensation 13 and recorded versus the measured bearing relative position and rate. Recall that the rate loop compensation responds by generating a torque command equal and opposite in polarity to any existing disturbance. These measurements of friction were approximate due to the bandwidth limitations of the rate loop and the presence of viscous damping disturbances and gyroscope noise which, although minimized, can not be completely removed in physical hardware.

Based upon the above friction disturbance waveform measurements and the desired goals for analog implementation as well as digital, the torque disturbance reference model was hypothesized, and later validated via experiments, as consisting of only two components: (1) a multiplier and (2) a first order low-pass filter. The multiplier takes the relative rate zero crossings waveform and multiplies it by the estimated coulomb friction level (CFL) to generate an output square wave of variable time period and of value either +CFL or −CFL. The relative rate zero crossings waveform is defined as the square wave of amplitude 1 obtained by taking the sign of the relative rate. If the sign of the relative rate is positive, the zero crossings waveform is +1; if the sign is negative, the zero crossings waveform is −1. The output of the multiplier is then used as the input to the low-pass filter. The low-pass filter removes the high frequency content of the input square wave and effectively "smooths" out the sharp corners of the square wave to provide an output which more accurately represents the non-zero rise time associated with actual bearing friction disturbances. The rise time is defined as the time required for the disturbance to reach 90% of its peak positive value when originally at its peak negative value, or vice-versa. Based upon the friction measurements above, it was noted that when the gimbel is subjected to repetitive reversals in relative rate, friction does not exhibit any significant component of stiction. The degree to which the square wave input is "smoothed" out is determined by the low-pass filter time constant, which, in turn, is set equal to the estimate of the friction disturbance spatial time constant (STC). As the STC increases, the rise time of the low-pass filter output waveform increases. By increasing the low-pass filter time constant from zero to a very large number, the output of this simple reference model can be adjusted to approximate from a "sharp" square wave to a "smooth" sine wave, respectively.

This hypothesized reference model was validated by experiments in which the present AFC invention was implemented. The gimbal inertial motion caused by friction and cable spring and damping disturbances was reduced 75% to 90% when the AFC was active as compared to the motion obtained when the AFC was not active. The 75% improvement was obtained when broad band random base motion was used. The 90% improvement was obtained when narrow band (sinusoidal) base motion was used.

The output of the torque disturbance model 31 is an estimate of the friction disturbance and is subtracted from the rate loop torque command signal in the summer 33, which is added to the prior art stabilization rate loop as discussed above, to generate the net torque command to the gimbal torquer 15. The estimate of the friction disturbance is subtracted in summer 33, rather than added, to cancel the input disturbance in summer 17. As the level and rise time of the estimate of the disturbance approaches the levels and rise time of the actual disturbance, the portion of the rate loop torque command which is correlated to the relative rate approaches zero and the CFL and STC estimates converge to constant values. It can be seen that the torque disturbance has been adaptively estimated on-line with immediate and concurrent compensation provided for the disturbances based upon the relative rate as opposed to the prior art delay wherein compensation takes place only after LOS jitter caused by these disturbances is encountered.

The output of summer 33 drives the driver/torquer 15, the output of which is fed to the summing node 17 which adds thereto the torque disturbance which includes gimbal friction, spring effects and viscous damping. The torque disturbances are physical quantities which are unknown in advance and change with temperature, characteristics of the base vibrational environment, and the gimbal angles. The output of the summer 17 drives the gimbal 19 and causes movement of the gimbal in accordance therewith. The output of the gimbal 19 is the gimbal inertial rate $\dot{\Theta}_g$. The inertial rate is sensed by a gyroscope 21 which is mounted on the gimbal 19. The output of the gyroscope 21 is summed in a summer 23 with a gyroscope noise signal, the output of this summer being fed back to the rate command summer 11 to complete the rate loop.

The response of the stabilization rate loop to rate commands is as follows. When the gyroscope 21 senses the same rate that is being commanded by the rate command, the rate error goes to zero and the torque command from rate compensation circuit 13 does not change and stays where it was. Accordingly, when this condition is reached, the actual gimbal rate is then the commanded rate.

The output from the torquer 15 should cancel the input to the summer 17 from the torque disturbances composed mainly of the gimbal friction, the spring effects and viscous damping. However, due to phase delays in the stabilization rate loop, exact cancellation does not take place if the rate loop is not aided by the AFC, leaving a net torque disturbance to the gimbal 19 which cannot be corrected and which is the cause of the jitter. Accordingly, the AFC compensation portion of the circuit is provided to compensate for this problem.

Figure 3:
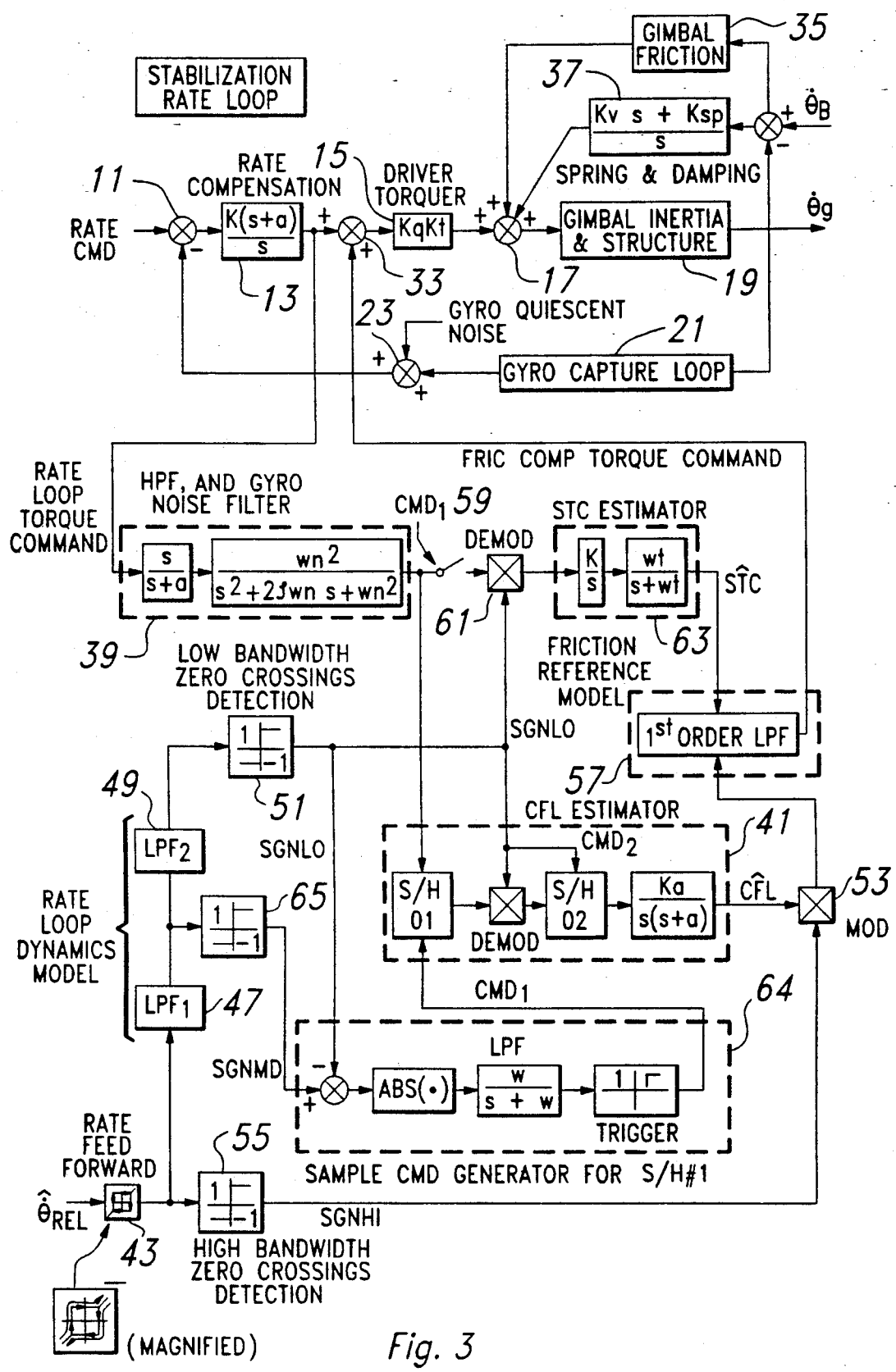
FIG. 3 is a detailed block diagram of the system of FIG. 2 wherein the filters and compensation algorithms have been represented by their Laplace Transforms using the variable "s" as is customary.

Referring now to FIG. 3, there is shown a detailed block diagram in accordance with the present invention. The system is composed of a stabilization rate loop which is the control loop shown above the horizontal double lines and is a stabilization system used in the prior art except for the summer 33 and the adaptive friction compensation circuit (below the double lines) which augments the stabilization rate loop. The adaptive friction compensation along with summer 33, is the inventive portion of the block diagram.

The rate command, which, for stabilization purposes, is zero, holds the gimbal inertial rate stationary. In addition, if there is tracking, there will be a low frequency component of the rate command coming from the tracker which moves the gimbal very slowly and follows the target. Therefore, if the gimbal 19 is to rotate at some predetermined speed, the rate command provides this information. Otherwise, the system is typically stabilized and the rate command signal is zero.

The rate compensation 13 is implemented in analog or digital electronics and conditions the rate loop to make it stable using proportional plus integral (PI) control which is known.

The driver/torquer 15 takes the voltage output of the rate compensation circuit and converts it to a current to drive the torquer which provides a motor torque. So the voltage is converted to a current which is converted to a torque.

The summing node 17 representing the additive nature of torque disturbances, adds the torque disturbances which are represented by gimbal friction block 35 and spring and viscous damping block 37 to the motor torque signal. The output of the summer 17, being the applied torque to the gimbal 19, causes movement of the gimbal. The torque disturbances are physical quantities which are unknown in advance in a real system and change with temperature, characteristics of base vibrational environment and gimbal pointing angles. The output of the gimbal 19 is the gimbal inertial rate $\Theta_g$. The inertial rate $\Theta_g$ is sensed by a gyroscope 21 which is mounted on the gimbal 19. The output of the gyroscope 21 is summed with a gyroscope noise signal in a summer 23, the output of this summer 23 being fed back to the rate command summer 11 where it is subtracted from the input rate command signal.

When the gyroscope 21 senses the same rate that is being commanded by the rate command, the rate error goes to zero and the output of the PI compensation 13 is such that the torque command does not change and stays where it was. Accordingly, when this condition is reached, the actual gimbal rate is the commanded rate.

The output from the torquer 15 should cancel the input to the summer 17 from the torque disturbances represented by the gimbal friction block 35 and the spring and viscous damping block 37. However, due mainly to phase delays in the stabilization rate loop, exact cancellation does not take place, leaving a net torque disturbance to the gimbal 19 which cannot be corrected and which is the cause of the gimbal LOS jitter. Accordingly, the compensation portion of the block diagram below the horizontal lines is provided to compensate for this problem.

As can be seen, an additional summer 33 has been placed in the stabilization rate loop between the rate compensation circuit 13 and the driver/torquer circuit 15. This summer 33 adds the output of the rate compensation circuit 13 and the output of the AFC compensation circuit to provide a net torque signal to drive the driver/torquer 15.

The rate loop torque command signal from the rate compensation circuit 13 is used as input to the AFC. This torque command signal is first conditioned in filter 39 because it contains high frequency noise, typically above 100 Hertz from the gyroscope 21. Most of this noise in the rate loop torque command signal is filtered out with a low pass filter in the filter 39 which also contains a high pass filter to remove any DC offsets caused by null spring torques, for example. The output of the low pass filter of circuit 39 is sampled by the sample and hold #1 portion of the CFL estimator 41 on the rising edge of its command signal, $CMD_1$, coming from the sample command generator 64. The rising edge is defined as the instantaneous positive step which occurs when the value of a signal changes from a low value to a high value, in the case of $CMD_1$, from 0 to +1.

As will be discussed hereinbelow, the rising edge of $CMD_1$ occurs just prior to each of the zero crossings detected by the zero crossings detector 51, the output of which is referred to as sgnlo, the low bandwidth zero crossings waveform. The term "low bandwidth" is used to identify sgnlo as having time delays associated with the limited bandwidth of the rate loop. Sample and hold #1 is included to filter out the effects of residual transients which occur near the zero crossings of the relative rate as well as transients induced by the rate loop dynamics. The output of sample and hold #1 is then demodulated to correct its polarity in the demodulator therein, which is a multiplier, by multiplying the signal by the low bandwidth zero crossing waveform or sgnlo signal which is a square wave of variable time period and of value ±1. The sgnlo signal is generated by taking the relative rate signal $\Theta_{REL}$ from sensor 29 in FIG. 2 and passing it through threshold detector 43 which ignores the relative rate signal if it is less than a predetermined threshold value, this value being determined by the amount of noise in the relative rate measurement. If the relative rate signal is continuously below the predetermined threshold, the true relative rate is assumed to be zero and the AFC compensation is disabled since no torque disturbances are expected with zero relative rate. Disabling the AFC compensation is accomplished by forcing the output of the high bandwidth zero crossings detector 55 to zero (this feature is not shown in FIG. 3), thus providing zero input to the friction reference model 57 and, in turn, zero friction compensation command to summer 33. In addition, the inputs to the integrators in the CFL and STC estimators, that is, the output of sample and hold #2 and the output of multiplier 61, respectively, are also forced to zero such that the current estimates of CFL and STC are not updated while the AFC compensation is disabled. This function of the threshold detector 43 used to disable the AFC compensation is not shown in the block diagram of FIG. 3.

The second and main function of the threshold detector 43 is to filter out the detection of zero crossings caused by sensor noise present in the measured relative rate signal $\theta_{REL}$, as shown in FIG. 3. The threshold level, TH, is set equal to three standard deviations (or the three sigma value) of the relative rate sensor quiescent noise. Using the three sigma value assures that the quiescent noise level will be below this value approximately 99% of the time, assuming that the noise has a Gaussian distribution as is typically the case in practice. This three sigma value does not change appreciably with time and need only be measured once for a particular sensor. The output of threshold detector 43 is determined as follows:

a) if the relative rate is greater than or equal to +TH, the output is set equal to the relative rate;

b) if the relative rate is less than or equal to −TH, the output is set equal to the relative rate;

c) if the relative rate is greater than +TH, but is decreasing, the output becomes −TH once the relative rate becomes less than +TH and the output is held constant at −TH until the relative rate becomes less than −TH or greater than +TH;

d) if the relative rate is less than −TH, but is increasing, the output becomes +TH once the relative rate becomes greater than −TH and the output is held constant at +TH until the relative rate becomes greater than +TH or less than −TH.

This main function of the threshold detector 43 is represented in FIG. 3 by the hysteresis loop drawn inside the block. Here, the input relative rate measurement corresponds to the x-axis of the hysteresis loop and the output of the detector corresponds to the y-axis. The underlying requirement for this detector to operate properly is that the relative rate measurement noise, and hence the threshold level, be small enough compared to the expected relative rate amplitudes such that the relative rate measurement signal is outside the hysteresis loop most of the time and is inside the loop only momentarily as it oscillates from a positive value greater than +TH to a negative value less than −TH and vice-versa.

The output of the threshold detector 43 is passed through the zero crossing detector 55 to generate the high bandwidth zero crossing waveform, sgnhi. Sgnhi is defined as a high bandwidth waveform compared to sgnlo because a minimum amount of time delay is introduced in detecting the zero crossings used to generate sgnhi as compared to the time delays associated with sgnlo. Sgnlo is a low bandwidth zero crossing waveform obtained by passing the output of the threshold detector 43 through the rate loop dynamics as modeled by the series combination of the two low-pass filters 47 and 49. The output of filter 49 is then passed through the zero crossing detector 51 to actually obtain sgnlo. Filters 47 and 49 add the time delays to the sgnlo signal required in order to match the time delays present in the rate loop torque command due to the limited bandwidth of the rate loop. Before the rate loop torque command can be operated on by sgnlo, the time delays in both signals must match. Since these time delays cannot be present in the friction compensation commands (maximum bandwidth is desired), sgnhi instead of sgnlo is used to generate the input to the friction reference model 57 via multiplier 53 which multiples sgnhi by the estimate of the friction level, CFL.

The hysteresis loop implemented in the threshold detector 43 when combined in series with the zero crossing detector 55 produces a zero crossing waveform in which the zero crossings are anticipated before they actually occur. That is, sgnhi switches from +1 to −1 at the instant the relative rate measurement becomes less than the +TH threshold level which must occur prior to the instant when the measurement crosses zero. Since a) the relative rate measurement noise is much higher in frequency than that of the actual zero crossing of the relative rate and b) TH is chosen as the three sigma value of the measurement noise, the resulting time lead (as opposed to time delay) varies for each consecutive zero crossing of the true relative rate, but, is guaranteed to be greater than zero 99% of the time and some finite positive value on the average. This effective time lead is included in the present AFC invention to account for and minimize the unavoidable time delays which will be present in any relative rate measurement obtained in practice.

The sgnlo signal and output of the sample and hold #1 circuit of estimator 41 are multiplied in the demodulator to correct the sign of the output of sample and hold #1 and is stored in the sample and hold #2 circuit. The sign of the output of sample and hold #1 will alternate between positive and negative because an oscillating base rate will cause the friction disturbance magnitude to change sign with each relative rate zero crossing. However, if the current estimate of the friction level is too small, the sign of sample and hold #1 must be corrected to always indicate a positive value (i.e, a positive error). Conversely, if the current estimate of the friction level is too high, the sign of sample and hold #1 must be corrected to always indicate a negative error. This correction of the sign of sample and hold #1 is accomplished by the demodulator. The output of the demodulator is again sampled by the sample and hold #2 which receives its command signal directly from sgnlo. Sample and hold #2 is included to effectively filter out spurious samples caused by the sample command, $CMD_1$, of sample and hold #1. These spurious commands are caused by the use of sgnmd and produce inaccurate samples of the rate loop torque command. Sgnmd is a medium bandwidth zero crossing wave form generated by passing the output of the first low pass filter 47 through the zero crossing detector 65. Since the bandwidth of sgnmd is higher than that of sgnlo, additional zero crossings due to noise will be detected, resulting in undesired spurious commands.

$CMD_1$ is generated in the sample command generator 64. Sgnlo is subtracted from sgnmd and the absolute value of the result is passed through a low pass filter, of bandwidth w. to provide the input to the trigger clock of the command generator. $CMD_1$ is the output of the trigger and is set equal to +1 when the input to the trigger is greater than a trigger value, TRG. $CMD_1$ is set equal to zero when the input to the trigger is less than TRG. TRG and w are selected to accomplish an effective time window during which the zero crossings detected by sgnmd are filtered out. The values of TRG and w used determine the width of this time window. The time window is required to filter out high frequency zero crossings which produce inaccurate samples of the rate loop torque command due to noise in the system and rate loop dynamics and limited bandwidth. Even after filtering out these high frequency zero crossings, spurious zero crossings pass through undetected every now and then. These spurious zero crossings are handled by the sample and hold #2 as discussed above.

Thus far, the rate loop torque command has been sampled and correlated to the relative rate zero crossings to generate the output of sample and hold #2 which is an error signal for the CFL estimator 41.

The output of the sample and hold #2 enters the CFL compensator which is an integrator with gain, K, and a low pass filter with bandwidth, a, thereon. This generates an estimate of the friction level as the output of the CFL estimator 41. This estimate of the friction level is modulated by modulator or multiplier 53 in conjunction with the sgnhi signal which is the relative rate measurement $\Theta_{rel}$ which has passed through the dead zone 43 and a high bandwidth zero crossing detector 55. The sgnhi signal will appear as a square wave of variable time period with values $\pm 1$. The estimate of the friction level well be relatively constant compared to the frequency of the zero crossings so the output of modulator 53 will approximate a square wave of variable time period with amplitude equal to the friction level estimate, $\hat{CFL}$.

The output of modulator 53 is fed to a friction reference model 57 which is a mathematical model that converts the output of modulator 53 to an estimate of the friction torque disturbance. This model is simply a first order low pass filter for which the time constant is set equal to the estimate of STC a obtained from the STC estimator 63, discussed hereinbelow. The output of the reference model 57 is passed back to the summer 33 of the stabilization rate loop to provide the required correction to the rate loop torque command.

By closing the switch 59, there is provided a path to the friction reference model 57 which includes a demodulator 61 and a spatial time constant estimator 63 which estimates the spatial time constant and which operates in parallel with the above described path to the model 57. The switch 59 is closed when $CMD_1$ is $+1$, allowing the output of filter 39 to pass through to the demodulator 61. When $CMD_1$ is zero, switch 59 is opened and the input to the demodulator is set to zero. Switch 59 is included to implement a gate at the input to the STC estimator 63. This gate blocks out the portion of the rate loop torque command which falls between the relative rate zero crossings. Only the transients which occur during the zero crossings are allowed through. Recall that these transients are characterized by the STC parameter which is precisely the value to be estimated here and the rate loop dynamics.

Analogous to the discussion of the friction level, if any error exists between the current estimate STC and its true value, a net torque disturbance will be applied to the rate loop, resulting in a non-zero value of the rate loop torque command during the zero crossings. More precisely, the rate loop torque command will display glitches at every zero crossing, even if CFL has already converged to the correct value. A correct estimate of CFL will result in zero rate loop torque command in between the zero crossings as desired, but the glitches during the zero crossings will be removed only if the estimate of STC is correct.

The switch 59 filters out the undesired portion of the rate loop torque command and helps decouple the CFL and STC estimators such that one does not significantly affect the other.

The output of switch 59 is multiplied with sgnlo in the demodulator 61 to correct the polarity of the gated rate loop torque command such that any glitches present will result in a positive error if the current estimate of STC is less than the true value and the glitches will result in a negative error if the current estimate of STC is greater than the true value. The output of the demodulator 61 is the error signal input to the STC estimator 63. This estimator is similar to the friction level estimator 41 and includes an integration and low pass filtering to provide the estimate of the spatial time constant. The main difference between the spatial time constant estimator 63 and the friction level estimator 41 is the way in which their input error signals are generated. For the CFL estimator, the error signal is generated by sampling the rate loop torque command from filter 39 just prior to a relative rate zero crossing and, after correcting its polarity, the sampled value is held constant until just prior to the next zero crossing when a new sample is taken. For the STC estimator, the error signal is set equal to the rate loop torque command from just prior to a zero crossing until some time period determined by the sample command generator 64. Once the time period expires, the error signal for the STC estimator is forced to zero. This time period corresponds to the time during which $CMD_1$ has a value of $+1$.

The use of the relative rate $\Theta_{REL}$ as opposed to the use of the rate loop torque command alone is of great significance since the relative rate measurement is a higher bandwidth signal and hence has less delay than the rate loop torque command signal. This allows for more rapid correction of torque disturbances. The ability to increase the bandwidth of the rate loop torque command is limited due to problems of stability and saturation inherent in the increased bandwidth thereof.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

APPENDIX

The following pages are programs written in C which can be used in place of the Laplace transforms set forth in FIGS. 2 and 3. These programs are not intended as stand-alone software. They only address the AFC portions of FIGS. 2 and 3. The are intended to show how the AFC algorithms can be implemented in software.

```
/*
*****************************************************************
* C Interupt for Microprocessor Implementation of the AFC algorithm *
* Program:   Adaptive Friction Compensation Algorithm *
* Date:      12/19/91 *
* File:      D:\UTILS\C\AFC\afc.int *
* Author:    Benny Maqueira - (404) 894-3724 *
*****************************************************************

**** Adaptive friction compensation using relative rate feed forward *
     This interupt routine is executed repeatedly at a constant sampling
     rate.
*/

/* Sample relative rate feed forward measurement and convert
        units from volts to rad/s.
        - assume rate sensor noise is filtered analog */
          Input = rate sensor      Output = brtsm brtsm = -reada2d(2)*Ktach;

/* HPF - remove DC offsets from relative rate measurement. */
          Input = brtsm      Output = brat brat = awp10 * (brtsm-brtsm1) - bwp11 * brat1;
          brat = brat / bwp10;
            /*Update states*/
            brtsm1 = brtsm;
            brat1 = brat;

/* Implement threshold detector, High BW zero crossings detector, and
        ON/OFF switch for adap filters.
        - if base rate is zero, do not adap STC and CFL estimates */
          Input = brat      Output = brtdz, sgnhi if (fabs(brat) < Rtdzn)           /*Threshold level = Rtdzn*/
          {
           if (brtdz != 0.0)
           {
            sgnhi = -sgnhi;                 /*Toggle sgnhi on entering*/
           }
           brtdz = 0.0;                     /*Threshold detector output*/
          }
          else
          {
           brtdz = brat;                    /*Threshold detector output*/
           sgnhi = 1;                       /*Assume positive*/
           if (brtdz < 0.0) {sgnhi = -1;}   /*otherwise negate*/
          }

/* Low BW zero crossings detection
        Apply rate loop dyn to match phase - two 2nd order filters */
          Input = brtdz,       Output = brtlp, sgnmd, sgnlo brtlpa = (brtdz + 2*brtdz1 + brtdz2) * Gain10
                       - bwp101*brtlpa1 - bwp102 * brtlpa2;
               brtlpa = brtlpa / bwp100;
                 /*Update states*/
                 brtdz2 = brtdz1;
                 brtdz1 = brtdz;
                 brtlpa2 = brtlpa1;
                 brtlpa1 = brtlpa;

brtdza = brtlpa;
               brtlp = (brtdza + 2*brtdza1 + brtdza2) * Gain10
```

```
                    - bwp101*brtlp1 - bwp102 * brtlp2;
       brtlp = brtlp / bwp100;
         /*Update states*/
         brtdza2 = brtdza1;
         brtdza1 = brtdza;
         brtlp2 = brtlp1;
         brtlp1 = brtlp;

/* Low BW and Middle BW zero crossings detectors */
       Input = brtlpa, brtlp    Output = sgnmd, sgnlo sgnmd = 1;
         if (brtlpa < 0.0) {sgnmd = -1;}
         sgnlo = 1;
         if (brtlp < 0.0) {sgnlo = -1;}

/* Measured residual torque disturbance (from rate loop torque
     command, Icmd) */ trqms = Icmd;

/* Filter out gyro noise */
       Input = trqms         Output = trqlp trqlp = (trqms + 2*trqms1 + trqms2) * Gain2
                 - bwp21*trqlp1 - bwp22 * trqlp2;
         trqlp = trqlp / bwp20;
           /*Update states*/
           trqms2 = trqms1;
           trqms1 = trqms;
           trqlp2 = trqlp1;
           trqlp1 = trqlp;

/* Sample command generator for S/H #1
       Input = sgnmd, sgnlo    Output = Diflp  */ sgndif = abs(sgnmd - sgnlo);

/* LPF to generate a time delay */

Diflp = ( (sgndif + sgdif1)*Gain3 - bwp31*Diflp1 ) / bwp30;
           /*Update states*/
           sgdif1 = sgndif;
           Diflp1 = Diflp;

/* Sample & hold on trqlp (S/H #1 w/ high bw zero crossings
       or, equivalently, at rising edges of CMD1)
       Generate sample cmd (with LPF) for S/H #1 */
         if (Diflp > triglv  &  CMD1 == 0)
         {
           CMD1 = 1;
           CMD2 = 1;                   /* Command for S/H #2 */
           /* Sample trqlp */
           trqsh = trqlp;
         }
         else
         {
           /* Reset CMD1 */
           if (Diflp < triglv) {CMD1 = 0;}
         }

/* CFL and STC Estimators */

/* Update STC and CFL estimates if base rate is not zero */ if (brtdz != 0.0)
   {
```

```
/* CFL Estimator */

/* Demodulate sampled torque */
    tqrec = sgnlo * trqsh;

/* Sample & Hold #2 on a sgnlo transition if trqsh has
     been updated */
    if (sgnlo != sgno)
    {
     if (CMD2 == 1)
     {
      cflhp = -tqrec;
      /* Reset */
      CMD2 = -1;
     }
     /* save last sgnlo value */
     sgno = sgnlo;
    }
/*CFL estimator LPF compensation*/ cflt = ( (cflhp + cflhp1)*Gain4 - bwp41*cflt1 ) / bwp40;
    /*Update states*/
    cflhp1 = cflhp;
    cflt1 = cflt;

/*Integrate CFL Error*/
  inp5 = cflt;
  out5 = ( inp5 + inp51 + Ti2*out51 ) / Ti2;
  if (out5 > Cflim) {out5=Cflim;}
    /*Update states*/
    inp51 = inp5;
    out51 = out5;
  cferr = out5;

/*CFL estimate*/
   cfcmp = estgn * cferr + Cflic;

/* STC Estimator */

/* Select gain of STC estimator based on CFL error */
    if (fabs(cflt) < cfltrn)
    {
     stcgn=Stc/stctrn;
     if (stcgn<1.0) {stcgn=1.0;}
     stcgn=stcgn2*stcgn*stcgn*stcgn;
    }
    else
    {
     stcgn=1;
    }

/* Generate input to STC estimator
     trqlp demodulation for Stc */
    if (CMD1 == 0)
    {
     stcsmp = trqlp * sgnlo * stcgn;
    }
    else
    {
     stcsmp = 0.0;
    }

/* STC estimator LPF compensation */ stcer = ( (stcsmp + stcpi1)*Gain8 - bwp81*Stctm1 ) / bwp80;
```

```
/*Update states*/
stcpil = stcsmp;
Stctml = stcer;

/* Integrate to generate STC error */ inp6 = stcer;
  out6 = ( inp6 + inp61 + Ti2*out61 ) / Ti2;
    /*Update states*/
    inp61 = inp6;
    out61 = out6;
  if (out6 > stcub) {out6=stcub;}
  if (out6 < stclb) {out6=stclb;}

/* PI compensation */
  Stctmp = out6 * stcpgn;
  /**** Stctmp = z30 * stcign + out6 * stcpgn; *****/

/* Add initial condition */
    Stc = Stctmp + stcic;

}
/* End Adapt */

/* Friction Reference Model */ trq0 = cfcmp * sgnhi;

inp9 = Stc * fabs( 1.0 - out9/trq0 ) * sgnhi;
  out9 = ( inp9 + inp91 + Ti2*out91 ) / Ti2;

if (out9 > cfcmp) {out9 = cfcmp;}
  if (out9 < -cfcmp) {out9 = -cfcmp;}
    /*Update states*/
    inp91 = inp9;
    out91 = out9;

trqfc = out9;
```

I claim:

1. A friction compensation system which comprises:
(a) a stabilization rate loop including:
   (i) a first circuit responsive to a rate command signal and a feedback signal to provide a torque command signal;
   (ii) a second circuit responsive to an enhanced torque command signal and a signal representing torque disturbances to provide a net applied torque signal;
   (iii) a source of said signal representing torque disturbances;
   (iv) a gimbal having an inertial rotation correlated to said net applied torque signal; and
   (v) circuitry responsive to said inertial rotation of said gimbal to provide said feedback signal; and
(b) an adaptive friction compensator responsive to said torque command signal and in accordance with a predetermined model to provide said enhanced torque command signal to which said second circuit is responsive.

2. The system of claim 1 wherein said adaptive friction compensator includes a summer responsive to said torque command signal and said enhanced torque command signal.

3. The system of claim 1 wherein said adaptive friction compensator includes an estimator circuit responsive to said torque command signal controlling said predetermined model.

4. The system of claim 2 wherein said adaptive friction compensator includes an estimator circuit responsive to said torque command signal controlling said predetermined model.

5. The system of claim 3, wherein said predetermined model is a torque disturbance model responsive to said estimator circuit.

6. The system of claim 4 wherein said predetermined model is a torque disturbance model responsive to said estimator circuit.

7. The system of claim 3, further including a source of signals indicative of relative rate measurements, wherein said estimator circuit includes a coulomb friction level estimator responsive to said signals indicative of relative rate measurement and said torque command signal and a spatial time constant estimator responsive to said signals indicative of relative rate measurement and said torque command signal.

8. The system of claim 4, further including a source of signals indicative of relative rate measurements, wherein said estimator circuit includes a coulomb friction level estimator responsive to said signals indicative of relative rate measurement and said torque command signal and a spatial time constant estimator responsive to said signals indicative of relative rate measurement and said torque command signal.

9. The system of claim 5, further including a source of signals indicative of relative rate measurements, wherein said estimator circuit includes a coulomb friction level estimator responsive to said signals indicative of relative rate measurement and said torque command signal and a spatial time constant estimator responsive to said signals indicative of relative rate measurement and said torque command signal.

10. The system of claim 6, further including a source of signals indicative of relative rate measurements, wherein said estimator circuit includes a coulomb friction level estimator responsive to said signals indicative of relative rate measurement and said torque command signal and a spatial time constant estimator responsive to said signals indicative of relative rate measurement and said torque command signal.

11. A method of friction compensation which comprises the steps of:
(a) providing a torque command signal responsive to a rate command signal and a feedback signal;
(b) providing a net applied torque signal responsive to an enhanced torque command signal and a signal representing torque disturbances;
(c) providing said signal representing torque disturbances;
(d) rotating a gimbal with an inertial rotation correlated to said net applied torque signal;
(e) providing said feedback signal responsive to said inertial rotation of said gimbal; and
(f) providing said enhanced torque command signal responsive to said torque command signal and in accordance with a predetermined model.

12. The method of claim 11 further including the step of summing said torque command signal and said enhanced torque command signal.

13. The method of claim 11 further including controlling said predetermined model responsive to an estimation responsive to said torque command signal.

14. The method of claim 12 further including controlling said predetermined model responsive to an estimation responsive to said torque command signal.

15. The method of claim 13, wherein said predetermined model is a torque disturbance model responsive to said estimation.

16. The method of claim 14, wherein said predetermined model is a torque disturbance model responsive to said estimation.

17. The method of claim 13, further including providing signals indicative of relative rate measurements, wherein said estimation includes coulomb friction level estimation responsive to said signals indicative of relative rate measurement and said torque command signal and a spatial time constant estimation responsive to said signals indicative of relative rate measurement and said torque command signal.

18. The method of claim 14, further including providing signals indicative of relative rate measurements, wherein said estimation includes coulomb friction level estimation responsive to said signals indicative of relative rate measurement and said torque command signal and a spatial time constant estimation responsive to said signals indicative of relative rate measurement and said torque command signal.

19. The method of claim 15, further including providing signals indicative of relative rate measurements, wherein said estimation includes coulomb friction level estimation responsive to said signals indicative of relative rate measurement and said torque command signal and a spatial time constant estimation responsive to said signals indicative of relative rate measurement and said torque command signal.

20. The method of claim 16, further including providing signals indicative of relative rate measurements, wherein said estimation includes coulomb friction level estimation responsive to said signals indicative of relative rate measurement and said torque command signal and a spatial time constant estimation responsive to said signals indicative of relative rate measurement and said torque command signal.

* * * * *